INVENTOR.
RAYMOND A. GAUTHIER
BY
Dike, Thompson & Bronstein
ATTORNEYS

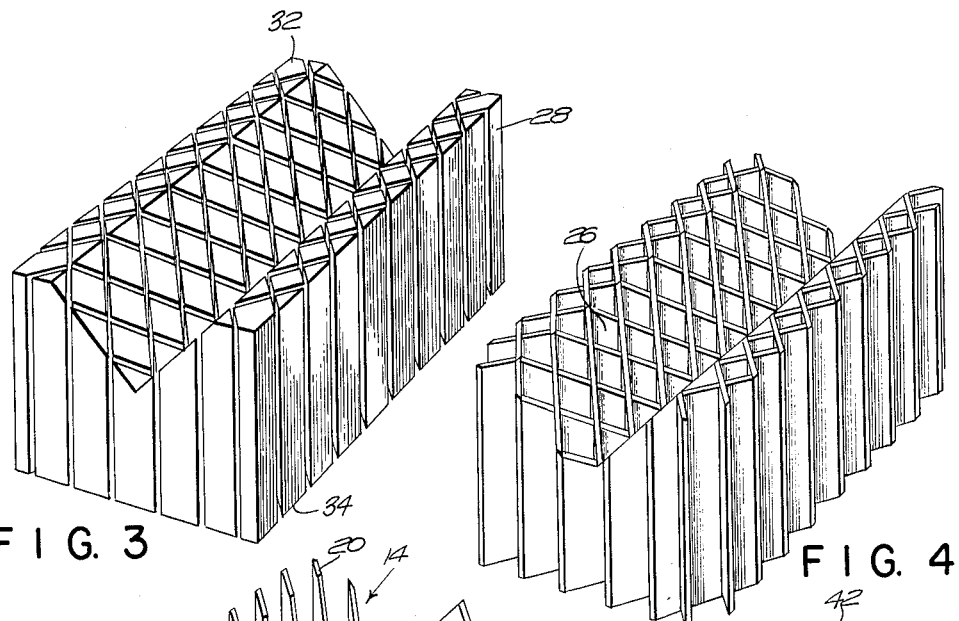
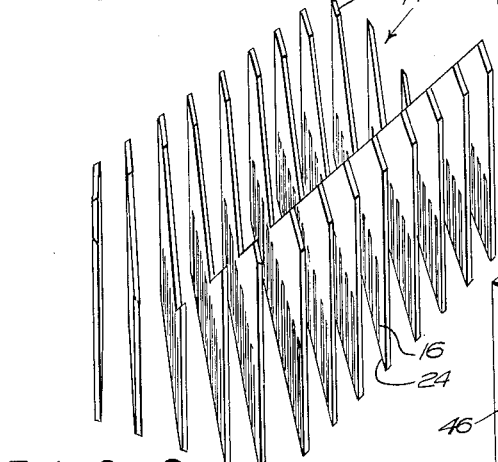
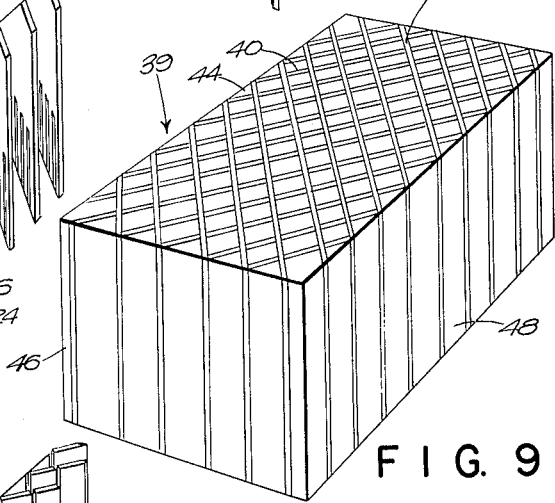
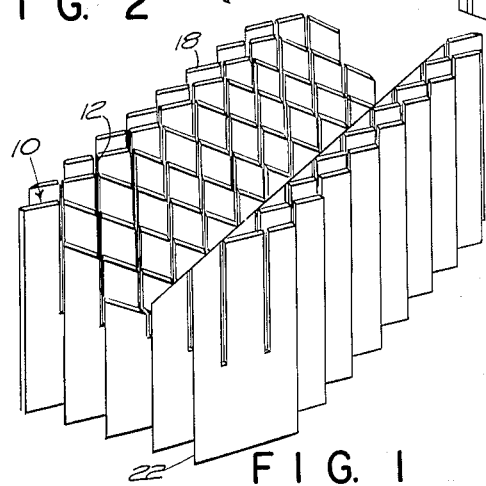

May 14, 1963  R. A. GAUTHIER  3,089,986
MAGNETIC WORK-HOLDER

Filed March 28, 1960  3 Sheets-Sheet 3

INVENTOR.
RAYMOND A. GAUTHIER
BY
*Dike, Thompson & Bronstein*
ATTORNEYS

United States Patent Office 3,089,986
Patented May 14, 1963

3,089,986
MAGNETIC WORK-HOLDER
Raymond A. Gauthier, 203 W. Hooper St.,
North Tiverton, R.I.
Filed Mar. 28, 1960, Ser. No. 17,837
10 Claims. (Cl. 317—162)

The present invention relates to an improved magnetic work-holder, such as a magnetic jig, for magnetic chucks and an improved method for making the same. Such work-holder is so constructed that when it is supported on the top plate of a magnetic chuck, magnetic flux is conducted therethrough to hold the holder to the top plate and the work to the holder regardless of the position of the holder about its vertical axis. The holder comprises a magnetic flux conducting body which is divided into a plurality of separate magnetic flux conductors insulated from each other by pole separators of non-magnetic flux conducting material.

A known method for making such holders is to provide a core or skeleton of two sets of parallel non-magnetic flux conducting plates crossing each other at right angles and arranged much as cardboard strips are arranged in packing eggs to keep the eggs separated. The crossed sets of parallel plates form compartments and are held together by tie rods. The plates are loosely interfitted with each other so as to have a slight play with respect to each other. The core or skeleton is embedded in a molten magnetic material, such as iron or steel, and the molten material is allowed to cool. Shrinkage of the molten iron or steel upon cooling theoretically causes a displacement of the core plates because of the loose fit therebetween to clamp the plates between the cooled sections of molten material. One set of plates is parallel to the sides of the holder and the other set is parallel to the ends of the holder. Thus, where the holder has a V-shaped, work receiving trough or recess extending across the upper face thereof and parallel to the sides thereof, which is a conventional work-holder construction, one set of plates is parallel to the longitudinal direction of the recess and the other set is perpendicular to such direction.

This method is difficult, expensive and generally unsatisfactory because of the difficulty in properly aligning the loose plates and keeping them aligned by the tie-rods. Good results may not always be achieved because of this. Also, the use of hot molten iron or steel is dangerous and difficult. Furthermore, it has been found that with a work-holder having an elongated work-receiving recess across a face thereof, as aforesaid, the lines of contact between the work and the walls of the recess are apt to fall entirely on the non-magnetic flux conducting plates so that the work is not securely held to the holder.

An object of the present invention is to provide a work-holder for magnetic chucks having a construction which overcomes these disadvantages and a method for making such holders, which method is inexpensive, simple, foolproof and easy to carry out with consistently good results being insured even by unskilled personnel. The method of the invention avoids the necessity of tie-rods to keep the plates properly aligned, avoids the danger of misalignment of such plates with consequent spoiling of the final product and also avoids the necessity of handling hot molten iron or steel with its attendant disadvantages.

Another object is to provide a magnetic work-holder the height of which may be adjusted without deleteriously affecting the ability of the holder to conduct magnetic flux in all rotational positions about its vertical center line.

In accordance with the method of the present invention preformed blocks or columns of steel or iron or other magnetic flux conducting material forming the magnetic conductors are inserted into the compartments formed by the crossed plates and then soldered to the strips. The insertion of the preformed blocks automatically insures proper alignment of the plates to form compartments of correct and uniform shape without the necessity of tie-rods. The upper and lower edges and the upper and lower end surfaces of the plates and steel blocks respectively lie in and form the upper and lower faces respectively of the holder. In the case of a holder having a work-receiving recess in the upper face thereof, both sets of plates are not only at an angle to each other but in accordance with the present invention are at an angle to the direction of the recess to insure magnetic flux conducting contact between the work and the end faces of at least some of the magnetic conductors (steel columns). The plates and steel blocks extend vertically from the upper face to the lower face of the holder.

Other objects and advantages of the invention will become apparent from the following description and the accompanying drawings which illustrate two embodiments of the invention and in which:

FIG. 1 is a view in perspective of one set of non-magnetic flux conducting plates.

FIG. 2 is a view in perspective of the other set of non-magnetic flux conducting plates.

FIG. 3 is a view in perspective of the preformed magnetic flux conducting blocks or columns.

FIG. 4 is a view in perspective of the two sets of plates assembled during the fabrication of the holder.

FIG. 9 is a view in perspective of another embodiment of the invention.

Figure 5:
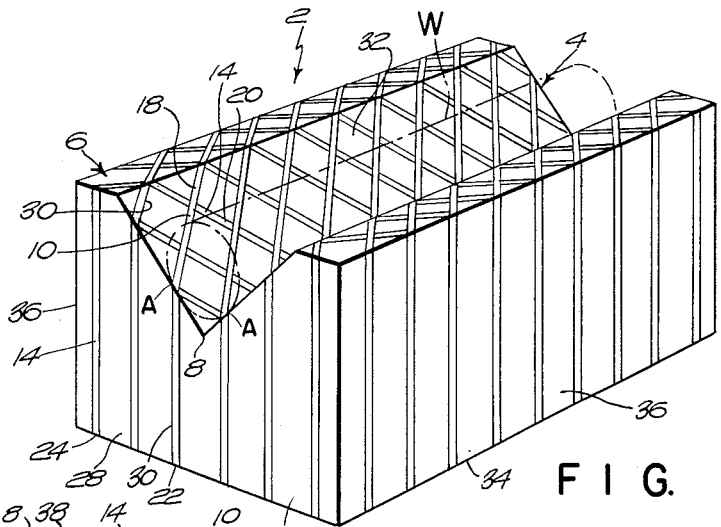
FIG. 5 is a view in perspective of the final assembled holder.
Figure 6:
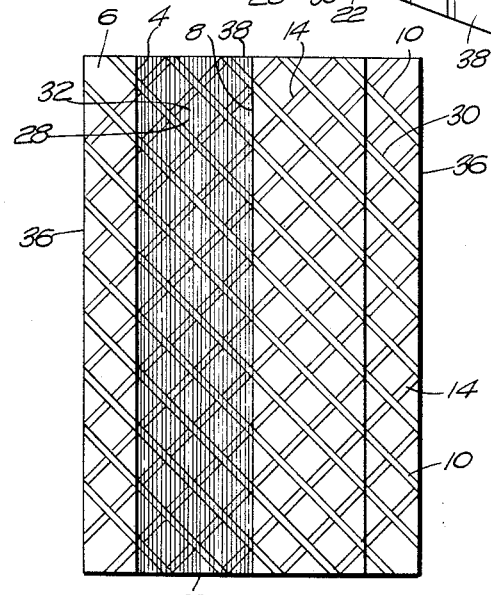
FIG. 6 is a top view of the holder of FIG. 5.
Figure 7:
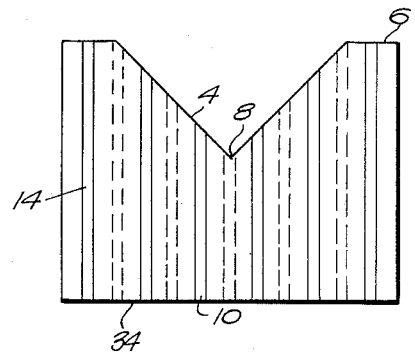
FIG. 7 is an end view of the holder of FIG. 5.
Figure 8:
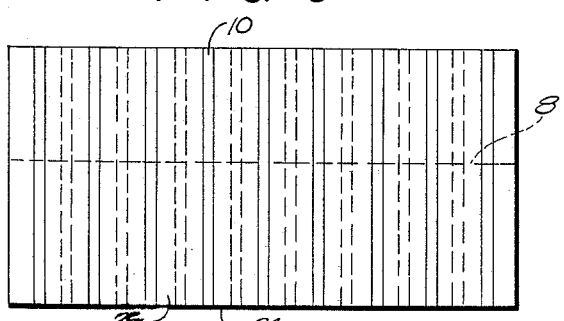
FIG. 8 is a view in elevation of the holder of FIG. 5.

With reference to drawings, 2 (FIG. 5) represents a holder embodying the present invention. It is in the form of an elongated rectangular block having an elongated, centrally located, V-shaped work receiving notch or recess 4 extending across the upper face 6 thereof from end to end of the block and in a direction parallel to the sides 36 of the block, the bottom corner of the recess forming the apex of the V being indicated as 8 in the drawings.

The block comprises a first set of parallel plates 10 made of brass or some other non-magnetic flux conducting material and having equidistantly spaced notches 12 in the top edges thereof and a second set of parallel plates 14 made of the same material and having equidistantly spaced notches 16 in the lower edges thereof which interlock with notches 12 of plates 10 so that the top notched edges 18 of the plates 10 are flush with the top unnotched edges 20 of plates 14 and the unnotched lower edges 22 of plates 10 are flush with lower notched edges 24 of plates 14, as shown in FIG. 4, the distance between, and width of, notches 16 being substantially equal to the distance between, and width of, notches 12. Plates 10 intersect and are arranged perpendicular to plates 14. Plates 10 are also located at an angle of about 45 degrees with respect to the longitudinal direction of recess 4 and hence at an angle of about 45 degrees with respect to the bottom corner line 8 thereof and the side walls 36 and longitudinal center lines of the block and recess. Plates 14 are also located at an angle of about 45 degrees with respect to the longitudinal direction of recess 4 and hence at an angle of about 45 degrees with respect to the botom corner line 8 and to the side walls 36 and longitudinal center lines of the block and recess. However, the angle between plates 10 and the direction of the recess and the angle between plates 14 and the direction of the recess can be different than 45 degrees and can be different from each other. Also the angle between the two sets of parallel plates can be different than 90 degrees, so long as the two sets of plates are located at an angle with respect to each other and each set is located at an angle with respect ot the direction of the recess.

The two sets of plates form compartments 26 (FIG. 4) which are square in cross sectional shape and in which are located preformed blocks or columns 28 made of cold rolled steel or some other magnetic flux conducting material. The blocks 28 are square in cross sectional shape and are silver-soldered to the plates 10 and plates 14 at 30 to form a solid, rigid unit 2. The walls of notches 12 are silver-soldered to the portions of plates 14 received therein and the walls of notches 16 are silver-soldered to the portions of plates 10 received therein.

The upper notched edges 18 of the plates 10, the upper unnotched edges of the plates 14 and the upper end surfaces 32 of columns 28 forming the recess 4 are contoured to correspond to the contour of, and form, such recess as shown in FIGS. 1 to 8. Thus, such upper edges and upper end surfaces are recessed and inclined as required to form the recess 4 when the parts are assembled as shown in FIG. 5.

The plates 10 and 14 and the columns 28 extend vertically to and between the upper and lower faces of the block, the upper and lower edges of the plates and the upper and lower end faces of the columns lying in and forming the upper and lower faces respectively of the block. The upper faces 32 of the columns 28 are flush with the upper edges 18 and 20 of the plates 10 and 14 and the lower faces 34 of the columns are flush with the lower edges 22 and 24 of the plates 10 and 14. The lower face of the block as well as the opposite parallel side faces 36 and the opposite parallel end faces 38 are flat and the plates 10 and 14 extend horizontally to and between the side and end faces of the block, the end edges of the plates lying in such side and end faces and together with the vertical walls of the side and end columns 28 therebetween forming such end and side faces. Such end edges and such vertical walls are flush with each other. In the embodiment shown in FIGS. 5 to 8 the end and side faces of the holder are located at intersections of the two sets of plates so that in many cases the entire end edges of plate 14 do not extend to and lie in such side and end faces. However, this is not essential. It is noted that some of the plates extend from one side face of the block to the other, whereas others have one of their end edges lying in a side face with the other end edge lying in an end face. This is due to the fact that the plates extend at an angle of 45 degrees with respect to the faces.

In accordance with the method of the present invention, plates 10 and 14 and blocks 28 are cleaned in a conventional manner with conventional flux or acid. The plates 10 and 14 are then arranged as shown in FIG. 4. The blocks 28 are then inserted lengthwise into the compartments 26. The assembly can be placed in a suitable nest for holding the parts together while they are being assembled. The entire assembly is then silver soldered on all adjacent, opposed surfaces. The crross-sectional size of the columns 28 as compared to the cross-sectional dimension of the compartments 26 formed by the plates, and the width of the notches 12 and 16 as compared to the thickness of the plates are such that there is a slight clearance between the blocks and plates and between the walls of the notches and the portions of the plates received in such notches sufficient only for the flow of silver solder between the parts by capillary action to insure that all opposed and adjacent surfaces of the parts will be rigidly joined together. However, clearances sufficient for flow of silver solder by capillary action are so small that there is scarcely any play between the plates and between the blocks and plates when the blocks are inserted in the compartments so that the assembly is not a truly loose one. As a matter of fact, the fit between the blocks and plates and between the plates and notches may be considered more snug than loose. The silver solder unites and bonds the steel columns 28 and the brass plates together to form a rigid unit. Other soldering materials can be used. The preferred manner of soldering is by induction heat. Thereafter the unrecessed portion of upper face 6 and the lower face of the block are ground parallel and the side and end faces are ground parallel. The surfaces of the upper face forming the walls of recess 4 are also ground smooth to insure that the upper edges of the plates are flush with the upper end surfaces of the colmuns 28. Grinding of the lower, side and end faces performs this same function.

Insertion of the blocks 28 into the compartments 26 insures proper and uniform alignment of the plates while the unit is soldered together without the necessity of tie-rods.

The plates 10 and 14 may be arranged at an acute angle with respect to each other, in which case the compartments 26 and columns 28 would be diamond-shaped in cross section. Furthermore, the advantages of the method of the invention are achieved when one set of plates is parallel to the direction of recess 4 and the other set is at a right angle or some other angle to the first set but in such case the resulting work-holder has the disadvantage that the contact lines A (FIG. 5) between the work W and the walls of recess 4 might fall wholly on the upper edges of a pair of brass plates which run parallel to the recess with the result that flux is not conducted to the work and consequently the work is not held securely to the holder. On the other hand, with the arrangement shown in FIGS. 5 to 8, the lines of contact A between the work W and the walls of the recess will always lie on the upper faces of some of the magnetic conductors or columns 28 so that flux will always be conducted to the work to thereby hold the work securely to the holder, regardless of the dimensions of the work. This is true so long as there is an angular relationship between the plates and the longitudinal direction of the recess.

The work-holder 39 of FIG. 9 is made in substantially the same way as the holder of FIGS. 1 to 8. However, it is in the form of a rectangular block with no recess in the upper face thereof. It is made up of two sets of parallel non-magnetic flux conducting plates 40 and 42 extending at right angles with respect to each other to form compartments which are square in cross sectional shape and in which preformed columns 44 of magnetic flux conducting material are located, the blocks and plates being silver soldered together as in the case of the embodiment shown in FIGS. 1 to 8. Each set of plates is at an angle of about 45 degrees with respect to the longitudinal center line, and hence with respect to the end and side faces 46 and 48 respectively, of the holder. The angle between the two sets of plates may be acute and the angle between each set of plates and the longitudinal center line of the block may vary so long as each set is located at an angle with respect to such center line. The advantages of the method of the invention are achieved even if one set of plates in FIG. 9 is parallel to such longitudinal center line and hence to the side faces of the block and the other set is perpendicular to the first set and parallel to the end face of the block.

The size and shape of the holder may be varied as desired. For example, the holder may be square as well as rectangular.

A preferred material for the plates is clock brass, half-hard, Brown and Sharpe Gage No. 14. A preferred material for the blocks or columns is SAE 1015 or SAE 1020 cold rolled steel.

The height of the holders of FIGS. 1 to 9 is not critical and depends on the magnetic force of the chuck with which the holder is to be used but the particular embodiment shown in FIG. 5 has a height of one and three quarters inches.

In use, the holder is supported on the top plate of the magnetic chuck so that the lower face of the holder rests on such top plate, the work W being placed in the recess 4 in the case of the FIG. 5 embodiment and on top of the block in the FIG. 9 embodiment.

The distance between plates (size of compartments 26 and blocks 28) is not critical so long as the major portion of the total volume of the holder is made up of the magnetic flux conducting blocks. Neither is the thickness of the plates critical so long as it is sufficient to insulate the blocks from each other and keeping in mind the fact that the major portion of the total volume of the holder should comprise the blocks. The greater the ratio of total block volume to total plate volume the better so that the plates should preferably be relatively thin compared to the thickness of the blocks. With the use of blocks one quarter inch in thickness the holder comprises 65% block volume (steel or iron) and 35% plate volume (brass) but effectiveness is increased by the use of larger blocks with a greater ratio of steel to brass.

Figure 10:
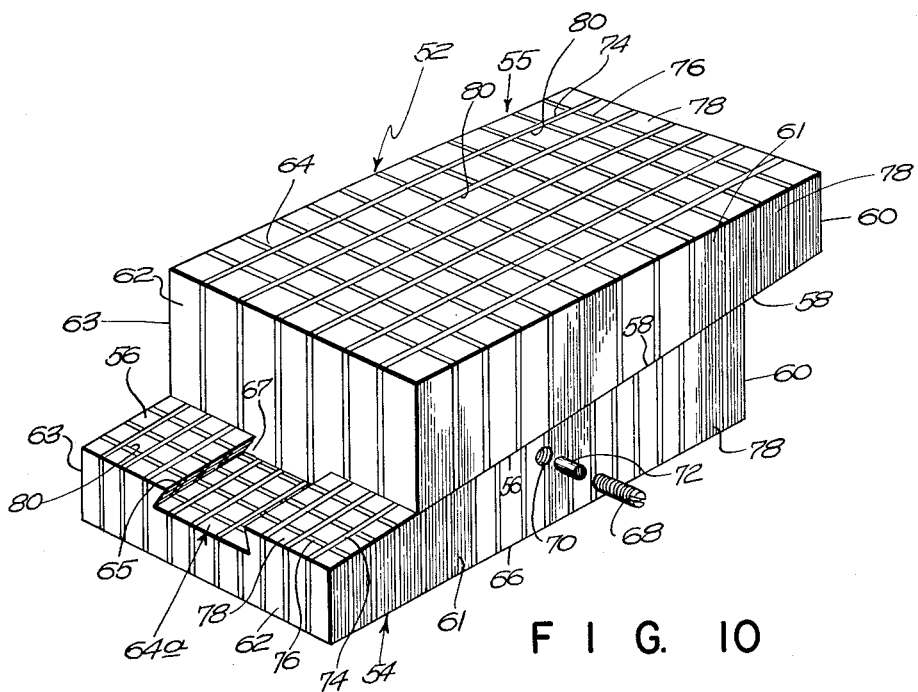
FIG. 10 is a view in perspective of a magnetic work-holder which embodies the invention and the height of which is adjustable.

FIG. 10 shows a magnetic work-holder 52, which is also made up of non-magnetic flux conducting plates with magnetic flux conducting columns therebetween but in which the vertical height is adjustable without deleteriously effecting the flux conductivity thereof. The holder is divided into a lower half 54, the upper surface 56 of which is inclined, and an upper half 55, the lower surface 58 of which has the same inclination as surface 56 and is slidably supported on the upwardly facing inclined surface 56 in face to face relation therewith, as shown in FIG. 10. The inclined face of each half extends from one end face 60 of the half to the other end face 62 thereof. The inclination of both inclined surfaces in the embodiment shown in the drawings is about 7½° but it may vary. The upper face 64 of the upper half is parallel to the lower face 66 of the lower half at all relative positions of the two halves with respect to each other. The opposite end faces 60 and 62 of each of the two halves are parallel with each other and the opposite side faces 61 and 63 are parallel with each other. The lengths and the widths of the two halves are equal so that when the left end faces 60 of the two halves, as viewed in FIG. 10, are vertically aligned and therefore lie in the same plane, the two halves form a rectangular block like that shown in FIG. 9 but which is split at the inclined plane in which the inclined surfaces 56 and 58 lie. The side faces of the two halves lie in the same plane at all positions of the two halves with respect to each other.

As aforesaid, the two halves 54 and 55 making up the holder 52 are adapted to be slidably moved with respect to each other on their inclined surfaces and in the direction of the length thereof to adjust the overall height of the holder between the upper face 64 and the lower face 66. When the upper half is slid to the right with respect to the lower half, as viewed in FIG. 10, it is moved up the inclined surface 56 of the lower half to increase the overall height of the holder between upper surface 64 on which the work is placed and lower surface 66 which lies on the magnetic plate of the chuck.

The two inclined surfaces are provided with a dove-tail arrangement 64a comprising an elongated, undercut, centrally located dove-tail slot 65 in the upwardly facing inclined surface 56 of the lower half and a centrally located, elongated male dove-tail ridge 67 extending downwardly from the downwardly facing inclined surface 58 of the upper half and slidably received within the dove-tail slot 65 to guide the sliding movement of the two halves with respect to each other and hold the halves together. The dove-tail slot and ridge extend along the length of the inclined surfaces.

A threaded set screw 68 is adapted to be screwed into a threaded tap hole 70 in the side 61 of the lower half to force the end of a cylindrical shaped soft metal slug 72 against the side of ridge 67 and thereby lock the two halves from sliding with respect to each other after they have been moved with respect to each other to positions giving the desired height between the upper face 64 and the lower face 66, the level of the tap 70 being above the floor of the slot 64 so that the slug 72 will engage the side of ridge 67.

Each of the halves is made up of a first series of vertically disposed, parallel, non-magnetic flux conducting plates 74 which are parallel to the side faces 61 and 63 of the holder, a second series of vertically disposed, parallel, non-magnetic flux conducting plates 76 intersecting the first set of plates at right angles thereto and parallel to the end faces 60 and 62 of the holder, and a plurality of pre-formed, elongated, vertically disposed magnetic flux conducting columns 78 of square cross sectional shape located in the square compartments 80 formed by the two series of plates and soldered to the plates as in the case of FIGS. 1 to 9. The plates have interfitting notches at their intersections as in the case of the embodiments of FIGS. 1 to 9 and each half is made in the same way as the holders of FIGS. 1 to 9.

Preferably, the square cross sectional size of the columns 78 and compartments 80 of the upper half is different from that of the lower half. For example, if the columns of one half each have a square cross sectional size of ¼ inch, the columns of the other half may have a square cross sectional size of 5/16 or ⅜ inch.

The angle between the plates of each of the halves may vary from a right angle. It may be an acute angle. It may be different for the two halves. Also the plates of each half may be at an acute angle with respect to the side and end faces of the holder as in FIG. 9. The angle of the plates of each half with respect to the side and end faces thereof may be different than the angle of the plates of the other half with respect to the side and end faces thereof.

Each half can be used individually or in conjunction with the other half with or without additional magnetic blocks.

As in the other embodiments the plates and columns of each half extend from the upper face of the half to the lower face, the opposite ends of such plates and columns forming such faces.

Although in the embodiment shown in FIG. 10, when the end faces of the two halves are vertically aligned to provide a rectangular block, the longitudinal center lines of the steel columns of the upper half are axially aligned with the longitudinal center lines of the steel columns of the lower half, this is not necessary, so long as substantial portions of the columns of the two halves are axially aligned.

Although I have referred to two halves of the holder, one of the pieces may be less than one half and the other piece may be more than one half. For example, one piece can comprise two thirds of the total holder whereas the other can comprise one third.

It will be appreciated that the holder can comprise more than two vertically stacked pieces if it is desired to increase the range of adjustability. For example, three pieces can be so stacked, each engaging the other at an inclined plane.

I claim:

1. A work-holder comprising a block having a work-receiving recess in a face thereof, said block comprising a first set of non-magnetic flux conducting plates extending at an angle to the direction of said recess, a second set of non-magnetic flux conducting plates extending at an angle to said first set and at an angle to said direction of said recess and forming with said first set compartments containing magnetic flux conducting material bonded to said plates into a rigid unit.

2. A holder according to claim 1, said recess being a V-shaped recess.

3. A holder according to claim 1, the angle between the two sets of plates being approximately a right angle.

4. A holder according to claim 1, said plates and said magnetic flux conducting material extending from the face of said block in which said recess is located to an opposite face of said block, said first set of plates being parallel to each other and said second set of plates being parallel to each other, the opposite edges of said plates and the corresponding opposite end faces of said magnetic flux conducting material lying in and forming said opposite faces of said block.

5. A holder according to claim 4, said first set of plates being arranged perpendicular to said second set of plates.

6. A holder according to claim 1, each of said set of plates being at an angle of about 45 degrees with respect to direction of said recess.

7. A work-holder comprising a first set of non-magnetic flux conducting plates, a second set of non-magnetic flux conducting plates intersecting said first set of plates at an angle, said first set of plates extending at an angle to the side and end faces of said holder, said second set of plates also extending at an angle to said side and end faces, said plates forming compartments containing a magnetic flux conducting material bonded to said plates, said plates and said magnetic flux conducting material extending from a face of said holder to an opposite face.

8. A method of making a magnetic flux conducting work-holder comprising arranging two sets of plates of non-magnetic flux conducting material at an angle to each other and in intersecting and interlocking relationship with each other to form a plurality of compartments, inserting into said compartments preformed blocks of magnetic flux conducting material of substantially the same size as said compartments to hold the plates in proper alignment while said plates and blocks are united together and uniting said plates and blocks together into a rigid unit.

9. A method according to claim 8, said step of uniting said plates and blocks together into a rigid unit comprising applying solder to clearances between the blocks and plates to thereby solder said plates and blocks together.

10. A method according to claim 9, said solder being applied to clearances between oversized notches in each set of plates and portions of the other set of plates received in said notches.

References Cited in the file of this patent

UNITED STATES PATENTS

| | | |
|---|---|---|
| 1,312,546 | Karasick | Aug. 12, 1919 |
| 1,343,751 | Simmons | June 15, 1920 |
| 1,895,129 | Jones | Jan. 24, 1933 |
| 2,401,887 | Shepard | June 11, 1946 |
| 2,475,456 | Norlander | July 5, 1949 |
| 2,882,458 | Anderson et al. | Apr. 14, 1959 |